United States Patent Office.

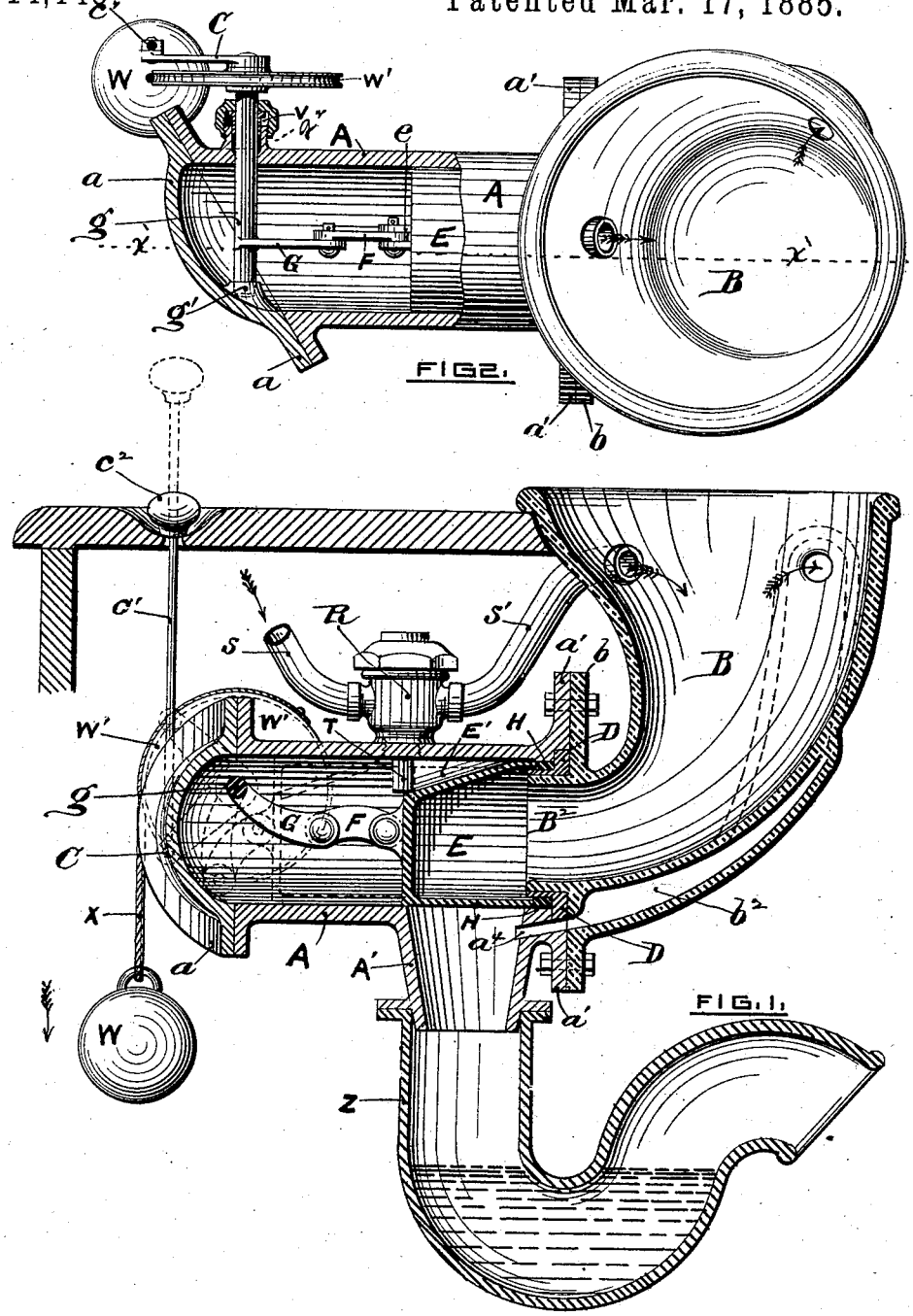

JAMES MUIRHEAD, OF OLNEYVILLE, RHODE ISLAND.

WATER-CLOSET.

SPECIFICATION forming part of Letters Patent No. 314,145, dated March 17, 1885.

Application filed September 14, 1883. (No model.)

*To all whom it may concern:*

Be it known that I, JAMES MUIRHEAD, of Olneyville, in the county of Providence and State of Rhode Island, have invented certain new and useful Improvements in Water-Closets, of which the following is a full and correct description, reference being had to the accompanying drawings, making a part of this specification.

This invention relates to that class of water-closets using a sliding gate or valve, and is illustrated in these drawings, in which—

Figure 1 shows a vertical section of the closet and trap, taken through the line $x'\ x'$, Fig. 2. Fig. 2 is a top view of the closet with a part of the top of the chamber removed to show the arrangement of the shaft, &c., inside.

The bowl B is made in a curved form at its lower end, which is joined to the horizontal chamber or case A by means of bolts passing through flanges $a'\ b$ made on both parts. The chamber A is preferably cast in one piece (excepting the cap $a$) with a flanged collar, A', at the bottom, to which the trap $z$ is attached. The end of the chamber that joins the bowl is rabbeted out on the inner edge of the opening to receive the flanged ring D, which is held in place by the flanges $a'\ b$ when the bowl and chamber are fast together. The flanged ring D has its horizontal portion made smaller than the inside of the chamber A, into which it projects, so that a space is formed between the ring and chamber to receive the packing H, which is protected by the end of the bowl and also by the ring, both of which project beyond it into the chamber A, from being affected by the contents of bowl when discharged, and from retaining any substance that would prevent the gate from closing tight.

The chamber A, which I prefer to make in a cylindrical shape, has its back end cut across diagonally, and a cap, $a$, secured to it by flanges. One bearing, $g'$, of the shaft $g$ is made on the inside of the cap and the other bearing, $g^2$, in the side of the chamber. By this arrangement when the cap is off, the shaft $g$ may be put in place or removed with the arm G cast on it. The bearing of the shaft in the side of the chamber has a stuffing-box, $v$, made on it, by which it is made perfectly tight, and the other bearing being on the inside there is no possible chance for the escape of sewer-gas.

E is a gate made of the same shape at its front end as the chamber A, in which it slides, the under side of the gate fitting closely to the bottom of the chamber, so that when the gate is clear forward the entrance to the trap A' is closed tightly. The gate E is made hollow in its front end to present an edge to enter the recess between the ring D and the chamber and press against the packing H. The top of the gate E is made with an incline, E', to receive the stem T of the water-valve R and raise it as the gate is drawn back to discharge the contents of the bowl. The gate is moved back and forward by the arm G on the shaft $g$, which is connected to the gate by the bar F, pivoted to the back end of the gate. Another arm, C, is attached to the outside end of the shaft $g$, to which a rod, C', is fastened, by which the shaft is turned. A grooved pulley, W', is also fastened to the shaft $g$, and provided with a cord, $x$, and weight, W, to assist in closing the gate. A water-valve, R, is placed on the top of the chamber, with its stem T passing through and resting on the top of the gate E. S is the pipe leading from the valve to the tank, and the pipe S' connects the valve to the bowl B. An opening, $a^4$, is made in the collar A', to which the trap is attached, that agrees with an opening in the bowl from the overflow-passage through which the overflow from the bowl is discharged below the gate E into the trap. The closet is operated in the usual way by pulling up the rod $c'$, which turns the shaft $g$ by the arm C and carries down the arm G inside the chamber. This draws the gate E back by the bar F, and allows the contents of the bowl to pass down into the trap $z$. The position of the parts when the gate E is back is shown by dotted lines in Fig. 1. As the gate E moves back, the incline E' on the top of the gate raises the stem T of the water-valve R and allows the water to pass through the pipe S' into the bowl. By pressing down the rod $c'$ the motion of the shaft is reversed and the gate E pushed forward so as to cover the entrance into the trap. At the same time it presses its front edge against the packing H on the flanged ring D and closes the opening into the bowl B. By this arrangement the passage from the trap to the bowl is doubly sealed, first, by the gate E covering the opening to the trap; secondly, by the gate closing the entrance to the bowl.

Having thus described my improvements, what I claim as my invention is—

1. The chamber A, having the bearing $g^2$ and cap $a$, placed diagonally at its rear end, said cap having bearing $g'$, in combination with the shaft $g$, and means for operating said shaft, substantially as and for the purpose set forth.

2. The gate E, recessed in front, and having an incline, E', on its top, in combination with the water-valve R, valve-stem T, and chamber A, substantially as and for the purpose set forth.

Signed by me in the presence of these witnesses.

JAMES MUIRHEAD.

Witnesses:
ARTHUR L. BROWN,
AUGUSTUS S. MILLER.